(12) United States Patent
DiBernado et al.

(10) Patent No.: US 9,360,300 B2
(45) Date of Patent: Jun. 7, 2016

(54) METHODS AND APPARATUS FOR POSITION ESTIMATION USING REFLECTED LIGHT SOURCES

(71) Applicant: iRobot Corporation, Bedford, MA (US)

(72) Inventors: Enrico DiBernado, Bedford, MA (US); Paolo Pirjanian, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 142 days.

(21) Appl. No.: 14/293,228

(22) Filed: Jun. 2, 2014

(65) Prior Publication Data

US 2014/0268179 A1 Sep. 18, 2014

Related U.S. Application Data

(63) Continuation of application No. 13/651,080, filed on Oct. 12, 2012, now Pat. No. 8,780,342, which is a continuation of application No. 13/204,075, filed on Aug. 5, 2011, now Pat. No. 8,295,955, which is a (Continued)

(51) Int. Cl.
 *G01B 11/00* (2006.01)
 *G01S 5/16* (2006.01)

(Continued)

(52) U.S. Cl.
 CPC ............. *G01B 11/002* (2013.01); *G01C 3/06* (2013.01); *G01S 5/163* (2013.01); *G01S 17/06* (2013.01); *G01S 17/48* (2013.01); *G05D 1/0234* (2013.01)

(58) Field of Classification Search
 CPC ........ G01B 11/002; G01C 3/06; G01S 17/06; G01S 17/48; G01S 5/163

USPC ......................................................... 356/614
See application file for complete search history.

(56) References Cited

U.S. PATENT DOCUMENTS 2,136,324 A 11/1938 John
2,353,621 A 7/1944 Sav et al.

(Continued)

FOREIGN PATENT DOCUMENTS

DE 2128842 C3 12/1980
DE 3317376 C2 12/1987

(Continued)

OTHER PUBLICATIONS

Andersen et al., "Landmark based navigation strategies," SPIE Conference on Mobile Robots XIII, SPIE vol. 3525, pp. 170-181, Jan. 8, 1999.

(Continued)

*Primary Examiner* — Timothy A Brainard
(74) *Attorney, Agent, or Firm* — Fish & Richardson P.C.

(57) ABSTRACT

The invention is generally related to the estimation of position and orientation of an object with respect to a local or a global coordinate system using reflected light sources. A typical application of the method and apparatus includes estimation and tracking of the position of a mobile autonomous robot. Other applications include estimation and tracking of an object for position-aware, ubiquitous devices. Additional applications include tracking of the positions of people or pets in an indoor environment. The methods and apparatus comprise one or more optical emitters, one or more optical sensors, signal processing circuitry, and signal processing methods to determine the position and orientation of at least one of the optical sensors based at least in part on the detection of the signal of one or more emitted light sources reflected from a surface.

23 Claims, 3 Drawing Sheets

Related U.S. Application Data continuation of application No. 12/780,746, filed on May 14, 2010, now Pat. No. 7,996,097, which is a continuation of application No. 11/090,621, filed on Mar. 25, 2005, now Pat. No. 7,720,554.

(60) Provisional application No. 60/557,252, filed on Mar. 29, 2004.

(51) Int. Cl.
 G01S 17/06 (2006.01)
 G01S 17/48 (2006.01)
 G01C 3/06 (2006.01)
 G05D 1/02 (2006.01)

(56) References Cited

U.S. PATENT DOCUMENTS

| | | |
|---|---|---|
| 2,770,825 A | 11/1956 | Pullen |
| 3,119,369 A | 1/1964 | Harland et al. |
| 3,166,138 A | 1/1965 | Dunn |
| 3,333,564 A | 8/1967 | Waters |
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,674,316 A | 7/1972 | De Brey |
| 3,678,882 A | 7/1972 | Kinsella |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De bray |
| 4,196,727 A | 4/1980 | Verkaart et al. |
| 4,198,727 A | 4/1980 | Farmer |
| 4,199,838 A | 4/1980 | Simonsson |
| D258,901 S | 4/1981 | Keyworth |
| 4,297,578 A | 10/1981 | Carter |
| 4,309,758 A | 1/1982 | Halsall et al. |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,556,313 A | 12/1985 | Miller et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,644,156 A | 2/1987 | Takahashi et al. |
| 4,654,492 A | 3/1987 | Koerner et al. |
| 4,654,924 A | 4/1987 | Getz et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,710,020 A | 12/1987 | Maddox et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,846,297 A * | 7/1989 | Field ................. G01S 17/936 180/169 |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,880,474 A | 11/1989 | Koharagi et al. |
| 4,887,415 A | 12/1989 | Martin |
| 4,893,025 A | 1/1990 | Lee |
| 4,901,394 A | 2/1990 | Nakamura et al. |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,002,501 A | 3/1991 | Tucker |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |

(56) References Cited

U.S. PATENT DOCUMENTS

| | | |
|---|---|---|
| 5,070,567 A | 12/1991 | Holland |
| 5,084,934 A | 2/1992 | Lessig et al. |
| 5,086,535 A | 2/1992 | Grossmeyer et al. |
| 5,093,955 A | 3/1992 | Blehert et al. |
| 5,094,311 A | 3/1992 | Akeel |
| 5,105,502 A | 4/1992 | Takashima |
| 5,105,550 A | 4/1992 | Shenoha |
| 5,109,566 A | 5/1992 | Kobayashi et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,155,684 A | 10/1992 | Burke et al. |
| 5,163,202 A | 11/1992 | Kawakami et al. |
| 5,163,320 A | 11/1992 | Goshima et al. |
| 5,170,352 A | 12/1992 | McTamaney et al. |
| 5,182,833 A | 2/1993 | Yamaguchi et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,233,682 A | 8/1993 | Abe et al. |
| 5,239,720 A | 8/1993 | Wood et al. |
| 5,251,358 A | 10/1993 | Moro et al. |
| 5,258,822 A | 11/1993 | Nakamura et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,341,540 A | 8/1994 | Soupert et al. |
| 5,341,549 A | 8/1994 | Wirtz et al. |
| 5,345,649 A | 9/1994 | Whitlow |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,511,147 A | 4/1996 | Abdel-Malek |
| 5,515,572 A | 5/1996 | Hoekstra et al. |
| 5,534,762 A | 7/1996 | Kim |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |
| 5,720,077 A | 2/1998 | Nakamura et al. |
| 5,732,401 A | 3/1998 | Conway |
| 5,735,959 A | 4/1998 | Kubo et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,787,545 A | 8/1998 | Colens |
| 5,793,900 A | 8/1998 | Nourbakhsh et al. |
| 5,794,297 A | 8/1998 | Muta |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,831,597 A | 11/1998 | West et al. |
| 5,839,156 A | 11/1998 | Park et al. |
| 5,839,532 A | 11/1998 | Yoshiji et al. |
| 5,841,259 A | 11/1998 | Kim et al. |
| 5,844,232 A | 12/1998 | Pezant |
| 5,867,800 A | 2/1999 | Leif |
| 5,869,910 A | 2/1999 | Colens |
| 5,896,611 A | 4/1999 | Haaga |
| 5,903,124 A | 5/1999 | Kawakami |
| 5,905,209 A | 5/1999 | Oreper |

(56) References Cited

U.S. PATENT DOCUMENTS

| | | |
|---|---|---|
| 5,907,886 A | 6/1999 | Buscher |
| 5,910,700 A | 6/1999 | Crotzer |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,940,170 A | 8/1999 | Berg et al. |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,465 A | 2/2000 | Marcussen et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,049,620 A | 4/2000 | Dickinson et al. |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,088,020 A | 7/2000 | Mor |
| 6,094,775 A | 8/2000 | Behmer |
| 6,099,091 A | 8/2000 | Campbell |
| 6,101,670 A | 8/2000 | Song |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,112,143 A | 8/2000 | Allen et al. |
| 6,112,996 A | 9/2000 | Matsuo |
| 6,119,057 A | 9/2000 | Kawagoe |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,154,694 A | 11/2000 | Aoki et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,278,917 B1 | 8/2001 | Bauer et al. |
| 6,278,918 B1 | 8/2001 | Dickson et al. |
| 6,282,526 B1 | 8/2001 | Ganesh |
| 6,283,034 B1 | 9/2001 | Miles |
| 6,285,930 B1 | 9/2001 | Dickson et al. |
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,370,453 B2 | 4/2002 | Sommer |
| 6,374,155 B1 | 4/2002 | Wallach et al. |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,480,762 B1 | 11/2002 | Uchikubo et al. |
| 6,481,515 B1 | 11/2002 | Kirkpatrick et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,525,509 B1 | 2/2003 | Petersson et al. |
| D471,243 S | 3/2003 | Cioffi et al. |
| 6,535,793 B2 | 3/2003 | Allard |
| 6,548,982 B1 | 4/2003 | Papanikolopoulos et al. |
| 6,553,612 B1 | 4/2003 | Dyson et al. |
| 6,556,892 B2 | 4/2003 | Kuroki et al. |
| 6,557,104 B2 | 4/2003 | Vu et al. |
| D474,312 S | 5/2003 | Stephens et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van Kommer |

(56) References Cited

U.S. PATENT DOCUMENTS

| | | | |
|---|---|---|---|
| 6,586,908 B2 | 7/2003 | Petersson et al. |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,654,482 B1 | 11/2003 | Parent et al. |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,687,571 B1 | 2/2004 | Byrne et al. |
| 6,690,993 B2 | 2/2004 | Foulke et al. |
| 6,711,280 B2 | 3/2004 | Stafsudd et al. |
| 6,732,826 B2 | 5/2004 | Song et al. |
| 6,741,054 B2 | 5/2004 | Koselka et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,810,305 B2 | 10/2004 | Kirkpatrick |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,925,357 B2 | 8/2005 | Wang et al. |
| 6,925,679 B2 | 8/2005 | Wallach et al. |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,054,716 B2 | 5/2006 | McKee et al. |
| 7,057,120 B2 | 6/2006 | Ma et al. |
| 7,057,643 B2 | 6/2006 | Iida et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,075,661 B2 | 7/2006 | Petty et al. |
| 7,085,624 B2 | 8/2006 | Aldred et al. |
| 7,113,847 B2 | 9/2006 | Chmura et al. |
| 7,155,308 B2 | 12/2006 | Jones |
| 7,171,285 B2 | 1/2007 | Kim et al. |
| 7,173,391 B2 | 2/2007 | Jones et al. |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,246,405 B2 | 7/2007 | Yan |
| 7,248,951 B2 | 7/2007 | Hulden |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan |
| 7,320,149 B1 | 1/2008 | Huffman et al. |
| 7,324,870 B2 | 1/2008 | Lee |
| 7,328,196 B2 | 2/2008 | Peters |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 | 10/2008 | Svendsen et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,617,557 B2 | 11/2009 | Reindle |
| 7,620,476 B2 | 11/2009 | Morse et al. |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,693,605 B2 | 4/2010 | Park |
| 7,720,554 B2 | 5/2010 | DiBernardo et al. |
| 7,801,645 B2 | 9/2010 | Taylor et al. |
| 7,805,220 B2 | 9/2010 | Taylor et al. |
| 7,809,944 B2 | 10/2010 | Kawamoto |
| 7,849,555 B2 | 12/2010 | Hahm et al. |
| 7,853,645 B2 | 12/2010 | Brown et al. |
| 7,920,941 B2 | 4/2011 | Park et al. |
| 7,937,800 B2 | 5/2011 | Yan |
| 7,957,836 B2 | 6/2011 | Myeong et al. |
| 7,996,097 B2 | 8/2011 | DiBernardo et al. |
| 8,295,955 B2 | 10/2012 | DiBernardo et al. |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De Fazio et al. |

(56) References Cited

U.S. PATENT DOCUMENTS

| | | |
|---|---|---|
| 2002/0011813 A1 | 1/2002 | Koselka et al. |
| 2002/0016649 A1 | 2/2002 | Jones |
| 2002/0021219 A1 | 2/2002 | Edwards |
| 2002/0095239 A1 | 7/2002 | Wallach et al. |
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0019071 A1 | 1/2003 | Field et al. |
| 2003/0023356 A1 | 1/2003 | Keable |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0192144 A1 | 10/2003 | Song et al. |
| 2003/0193657 A1 | 10/2003 | Uomori et al. |
| 2003/0208304 A1 | 11/2003 | Peless et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0076324 A1 | 4/2004 | Burl et al. |
| 2004/0083570 A1 | 5/2004 | Song et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0125461 A1 | 7/2004 | Kawamura |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0200505 A1 | 10/2004 | Taylor et al. |
| 2004/0204792 A1 | 10/2004 | Taylor et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0021181 A1 | 1/2005 | Kim et al. |
| 2005/0033124 A1 | 2/2005 | Kelly et al. |
| 2005/0067994 A1 | 3/2005 | Jones et al. |
| 2005/0085947 A1 | 4/2005 | Aldred et al. |
| 2005/0144751 A1 | 7/2005 | Kegg et al. |
| 2005/0150074 A1 | 7/2005 | Diehl et al. |
| 2005/0154795 A1 | 7/2005 | Kuz et al. |
| 2005/0156562 A1 | 7/2005 | Cohen et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | De Guzman |
| 2006/0000050 A1 | 1/2006 | Cipolla et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0143295 A1 | 6/2006 | Costa-Requena et al. |
| 2006/0146776 A1 | 7/2006 | Kim |
| 2006/0184293 A1 | 8/2006 | Konandreas et al. |
| 2006/0190146 A1 | 8/2006 | Morse et al. |
| 2006/0196003 A1 | 9/2006 | Song et al. |
| 2006/0220900 A1 | 10/2006 | Ceskutti et al. |
| 2006/0259494 A1 | 11/2006 | Watson et al. |
| 2006/0288519 A1 | 12/2006 | Jaworski et al. |
| 2006/0293787 A1 | 12/2006 | Kanda et al. |
| 2007/0006404 A1 | 1/2007 | Cheng et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0043459 A1 | 2/2007 | Abbott et al. |
| 2007/0045018 A1 | 3/2007 | Carter et al. |
| 2007/0150096 A1 | 6/2007 | Yeh et al. |

(56) References Cited

U.S. PATENT DOCUMENTS

| | | | |
|---|---|---|---|
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0250212 A1 | 10/2007 | Halloran et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0184518 A1 | 8/2008 | Taylor et al. |
| 2008/0276407 A1 | 11/2008 | Schnittman et al. |
| 2008/0282494 A1 | 11/2008 | Won et al. |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0049640 A1 | 2/2009 | Lee et al. |
| 2009/0055022 A1 | 2/2009 | Casey et al. |
| 2009/0292393 A1 | 11/2009 | Casey et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2011/0125323 A1 | 5/2011 | Gutmann et al. |

FOREIGN PATENT DOCUMENTS

| | | |
|---|---|---|
| DE | 3536907 C2 | 2/1989 |
| DE | 199311014 U1 | 10/1993 |
| DE | 4338841 A1 | 5/1995 |
| DE | 4414683 A1 | 10/1995 |
| DE | 19849978 | 2/2001 |
| DE | 10242257 | 4/2003 |
| DE | 10357636 | 7/2005 |
| DE | 102004041021 B3 | 8/2005 |
| DE | 102005046813 A1 | 4/2007 |
| DK | 338988 A | 12/1988 |
| EP | 0265542 A1 | 5/1988 |
| EP | 0281085 A2 | 9/1988 |
| EP | 0433697 A2 | 6/1991 |
| EP | 0437024 A1 | 7/1991 |
| EP | 0479273 A | 4/1992 |
| EP | 0554978 A2 | 8/1993 |
| EP | 0615719 A1 | 9/1994 |
| EP | 0792726 A1 | 9/1997 |
| EP | 0798567 | 10/1997 |
| EP | 0294101 A | 12/1998 |
| EP | 0845237 B1 | 4/2000 |
| EP | 0861629 B1 | 9/2001 |
| EP | 1228734 A2 | 8/2002 |
| EP | 1331537 | 7/2003 |
| EP | 1380246 A2 | 1/2004 |
| EP | 1018315 B1 | 11/2004 |
| EP | 1553472 A1 | 7/2005 |
| EP | 1642522 A2 | 4/2006 |
| ES | 2238196 A1 | 8/2005 |
| FR | 2601443 A1 | 1/1988 |
| FR | 2828589 A1 | 2/2003 |
| GB | 702426 | 1/1954 |
| GB | 2128842 A | 5/1984 |
| GB | 2225221 A | 5/1990 |
| GB | 2267360 A | 12/1993 |
| GB | 2283838 A | 5/1995 |
| GB | 2284957 A | 6/1995 |
| GB | 2404330 A | 2/2005 |
| GB | 2417354 A | 2/2006 |
| JP | 59033511 U | 3/1984 |
| JP | 59099308 | 6/1984 |
| JP | 59112311 | 6/1984 |
| JP | 59120124 | 7/1984 |
| JP | 59131668 | 9/1984 |
| JP | 59164973 | 9/1984 |
| JP | 59184917 A | 10/1984 |
| JP | 2283343 A2 | 11/1984 |
| JP | 59212924 | 12/1984 |
| JP | 59226909 | 12/1984 |
| JP | 60089213 A | 5/1985 |
| JP | 60211510 A | 10/1985 |
| JP | 60259895 | 12/1985 |
| JP | 61023221 | 1/1986 |
| JP | 61097712 A | 5/1986 |
| JP | 62070709 | 4/1987 |
| JP | 62074018 A | 4/1987 |
| JP | 62164431 | 7/1987 |
| JP | 62263507 A | 11/1987 |
| JP | 62263508 A | 11/1987 |
| JP | 62189057 U | 12/1987 |
| JP | 63079623 A | 4/1988 |
| JP | 63158032 | 7/1988 |
| JP | 4019586 | 1/1992 |
| JP | 4074285 A | 3/1992 |
| JP | 4084921 A | 3/1992 |
| JP | 5023269 A | 2/1993 |
| JP | 5042076 A | 2/1993 |
| JP | 5046246 | 2/1993 |
| JP | 5150827 A | 6/1993 |
| JP | 5150829 A | 6/1993 |
| JP | 5-257527 | 10/1993 |
| JP | 5040519 Y2 | 10/1993 |
| JP | 05257527 A | 10/1993 |
| JP | 5257533 | 10/1993 |
| JP | 05285861 A | 11/1993 |
| JP | 6003251 U | 1/1994 |
| JP | 6137828 A | 5/1994 |
| JP | 6293095 A | 10/1994 |
| JP | 06327598 A | 11/1994 |
| JP | 6105781 A | 12/1994 |
| JP | 07129239 A | 5/1995 |
| JP | 7059702 B | 6/1995 |
| JP | 7270518 A | 10/1995 |
| JP | 7295636 | 11/1995 |
| JP | 7313417 A | 12/1995 |
| JP | 8016776 A | 1/1996 |
| JP | 8089449 A | 4/1996 |
| JP | 08089451 A | 4/1996 |
| JP | 8123548 A | 5/1996 |
| JP | 8152916 A | 6/1996 |
| JP | 8263137 A | 10/1996 |
| JP | 8335112 A | 12/1996 |
| JP | 9044240 A | 2/1997 |
| JP | 9066855 A | 3/1997 |
| JP | 9145309 A | 6/1997 |
| JP | 09179625 A | 7/1997 |
| JP | 09185410 | 7/1997 |
| JP | 2555263 Y2 | 8/1997 |
| JP | 09206258 A | 8/1997 |
| JP | 9265319 A | 10/1997 |
| JP | 9269807 A | 10/1997 |
| JP | 9269810 A | 10/1997 |
| JP | 9319432 A | 12/1997 |
| JP | 9319434 A | 12/1997 |
| JP | 9325812 A | 12/1997 |
| JP | 10-27018 | 1/1998 |
| JP | 10055215 A | 2/1998 |
| JP | 10117973 A | 5/1998 |
| JP | 10118963 A | 5/1998 |
| JP | 10177414 A | 6/1998 |
| JP | 10214114 | 8/1998 |
| JP | 10295595 A | 11/1998 |
| JP | 11015941 A | 1/1999 |
| JP | 11102220 A | 4/1999 |
| JP | 11162454 A | 6/1999 |
| JP | 11174145 A | 7/1999 |
| JP | 11175149 A | 7/1999 |
| JP | 11213157 A | 8/1999 |
| JP | 11508810 A | 8/1999 |
| JP | 11510935 | 9/1999 |
| JP | 11295412 A | 10/1999 |
| JP | 2000047728 | 2/2000 |

(56) References Cited

FOREIGN PATENT DOCUMENTS

| | | |
|---|---|---|
| JP | 2000056006 A | 2/2000 |
| JP | 2000056831 A | 2/2000 |
| JP | 2000066722 A | 3/2000 |
| JP | 2000075925 A | 3/2000 |
| JP | 2000275321 | 10/2000 |
| JP | 2000353014 A | 12/2000 |
| JP | 2001022443 A | 1/2001 |
| JP | 2001067588 | 3/2001 |
| JP | 2001087182 | 4/2001 |
| JP | 2001508572 A | 6/2001 |
| JP | 3197758 B2 | 8/2001 |
| JP | 3201903 B2 | 8/2001 |
| JP | 2001216482 A | 8/2001 |
| JP | 2001258807 | 9/2001 |
| JP | 2001265437 A | 9/2001 |
| JP | 2001-522079 | 11/2001 |
| JP | 2002-82720 | 3/2002 |
| JP | 2002204769 A | 7/2002 |
| JP | 2002333920 A | 11/2002 |
| JP | 2002360479 | 12/2002 |
| JP | 2002366227 | 12/2002 |
| JP | 2002369778 | 12/2002 |
| JP | 2003010076 A | 1/2003 |
| JP | 2003010088 A | 1/2003 |
| JP | 2003015740 | 1/2003 |
| JP | 2003084994 | 3/2003 |
| JP | 2003-515210 | 4/2003 |
| JP | 2003167628 A | 6/2003 |
| JP | 2003180587 A | 7/2003 |
| JP | 2003190064 A | 7/2003 |
| JP | 2003262520 A | 9/2003 |
| JP | 2003304992 A | 10/2003 |
| JP | 2003310509 A | 11/2003 |
| JP | 2004123040 A | 4/2004 |
| JP | 2004148021 A | 5/2004 |
| JP | 2004160102 A | 6/2004 |
| JP | 2004166968 A | 6/2004 |
| JP | 2004219185 | 8/2004 |
| JP | 2005118354 A | 5/2005 |
| JP | 2005224265 A | 8/2005 |
| JP | 2005230032 A | 9/2005 |
| JP | 2005245916 A | 9/2005 |
| JP | 2005352707 A | 12/2005 |
| JP | 2006043071 A | 2/2006 |
| JP | 2006155274 A | 6/2006 |
| JP | 2006164223 A | 6/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2007034866 A | 2/2007 |
| JP | 2007213180 A | 8/2007 |
| JP | 2009015611 A | 1/2009 |
| JP | 2010198552 A | 9/2010 |
| WO | 9526512 A1 | 10/1995 |
| WO | 9530887 A1 | 11/1995 |
| WO | 9617258 A1 | 6/1996 |
| WO | 9715224 | 11/1997 |
| WO | 9740734 A1 | 11/1997 |
| WO | 9741451 A1 | 11/1997 |
| WO | 9853456 A1 | 11/1998 |
| WO | 9905580 A2 | 2/1999 |
| WO | 9916078 A1 | 4/1999 |
| WO | 99/23543 | 5/1999 |
| WO | 9928800 | 6/1999 |
| WO | 9938056 A1 | 7/1999 |
| WO | 9938237 A1 | 7/1999 |
| WO | 9943250 A1 | 9/1999 |
| WO | 9959042 | 11/1999 |
| WO | 0038026 A1 | 6/2000 |
| WO | 0038028 A1 | 6/2000 |
| WO | 0038029 A1 | 6/2000 |
| WO | 0004430 A1 | 10/2000 |
| WO | 0078410 A1 | 12/2000 |
| WO | 0106904 A1 | 2/2001 |
| WO | 0106905 A1 | 2/2001 |
| WO | 01/37060 | 5/2001 |
| WO | 0239864 A1 | 5/2002 |
| WO | 0239868 A1 | 5/2002 |
| WO | 02067744 A1 | 9/2002 |
| WO | 02067745 A1 | 9/2002 |
| WO | 02067752 A1 | 9/2002 |
| WO | 02069774 A1 | 9/2002 |
| WO | 02069775 A2 | 9/2002 |
| WO | 02075350 A1 | 9/2002 |
| WO | 02081074 A1 | 10/2002 |
| WO | 03015220 A1 | 2/2003 |
| WO | 03024292 A2 | 3/2003 |
| WO | 03026474 | 5/2003 |
| WO | 03040546 A1 | 5/2003 |
| WO | 03040845 A1 | 5/2003 |
| WO | 03040846 A1 | 5/2003 |
| WO | 03062850 A2 | 7/2003 |
| WO | 03062852 A1 | 7/2003 |
| WO | 2004004533 A1 | 1/2004 |
| WO | 2004004534 A1 | 1/2004 |
| WO | 2004006034 A2 | 1/2004 |
| WO | 2005006935 A1 | 1/2005 |
| WO | 2005055795 A1 | 6/2005 |
| WO | 2005055796 A2 | 6/2005 |
| WO | 2005076545 A1 | 8/2005 |
| WO | 2005077243 A1 | 8/2005 |
| WO | 2005077244 A1 | 8/2005 |
| WO | 2005081074 A1 | 9/2005 |
| WO | 2005082223 A1 | 9/2005 |
| WO | 2005083541 A1 | 9/2005 |
| WO | 2005098475 A1 | 10/2005 |
| WO | 2005098476 A1 | 10/2005 |
| WO | 2006046400 A1 | 5/2006 |
| WO | 2006068403 A1 | 6/2006 |
| WO | 2006073248 A1 | 7/2006 |
| WO | 2007137234 A2 | 11/2007 |

OTHER PUBLICATIONS

Ascii, Mar. 25, 2002, http://ascii.jp/elem/000/000/330/330024/ accessed Nov. 1, 2011. 7 pages.

Becker et al., "Reliable Navigation Using Landmarks," IEEE International Conference on Robotics and Automation, 0-7803-1965-6, pp. 401-406, 1995.

Benayad-Cherif et al., "Mobile Robot Navigation Sensors," SPIE vol. 1831 Mobile Robots, VII, pp. 378-387, 1992.

Blaasvaer et al., "AMOR—An Autonomous Mobile Robot Navigation System," Proceedings of the IEEE International Conference on Systems, Man, and Cybernetics, pp. 2266-2271, 1994.

Borges et al., "Optimal Mobile Robot Pose Estimation Using Geometrical Maps," IEEE Transactions on Robotics and Automation, 18(1): 87-94, Feb. 2002.

Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.

Bulusu et al., "Self Configuring Localization systems: Design and Experimental Evaluation," *ACM Transactions on Embedded Computing Systems*, 3(1):24-60, 2003.

Caccia et al., "Bottom-Following for Remotely Operated Vehicles," 5th IFAC Conference, Alaborg, Denmark, pp. 245-250, Aug. 2000.

Chae et al., "StarLITE: A new artificial landmark for the navigation of mobile robots," http://www.irc.atr.jp/jk-nrs2005/pdf/Starlite.pdf, 4 pages, 2005.

Chamberlin et al., "Team 1: Robot Locator Beacon System, " NASA Goddard SFC, Design Proposal, 15 pages, Feb. 2006.

Champy, "Physical management of IT assets in Data Centers using RFID technologies," RFID 2005 University, Oct. 12-14, 2005 , 19 pages.

Chin, "Joystick Control for Tiny OS Robot," http://www.eecs.berkeley.edu/Programs/ugrad/superb/papers2002/chiri.pdf. 12 pages, Aug. 2002.

Christensen et al. "Theoretical Methods for Planning and Control in Mobile Robotics," 1997 First International Conference on Knowledge-Based Intelligent Electronic Systems, Adelaide, Australia, pp. 81-86, May 1997.

(56) References Cited

OTHER PUBLICATIONS

Clerentin et al., "A localization method based on two omnidirectional perception systems cooperation," *Proc of IEEE International Conference on Robotics & Automation*, San Francisco, CA vol. 2, pp. 1219-1224, Apr. 2000.
Corke, "High Performance Visual serving for robots end-point control," SPIE vol. 2056, Intelligent Robots and Computer Vision, 1993, 10 pages.
Cozman et al., "Robot Localization using a Computer Vision Sextant," IEEE International Midwest Conference on Robotics and Automation, pp. 106-111, 1995.
D'Orazio et al., "Model based Vision System for mobile robot position estimation", *SPIE*, vol. 2058 Mobile Robots VIII, pp. 38-49, 1992.
De Bakker et al., "Smart PSD—array for sheet of light range imaging", Proc. Of *SPIE*, vol. 3965, pp. 1-12, May 2000.
Desaulniers et al., "An Efficient Algorithm to find a shortest path for a car-like Robot," *IEEE Transactions on robotics and Automation*, 11(6):819-828, Dec. 1995.
Dorfmüller-Ulhaas, "Optical Tracking From User Motion to 3D Interaction," http://www.cg.tuwien.ac.at/research/publications/2002/Dorfmueller-Ulhaas-thesis, 182 pages, 2002.
Dorsch et al., "Laser Triangulation: Fundamental uncertainty in distance measurement," Applied Optics, 33(7):1306-1314, Mar. 1994.
Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.
Dulimarta et al., "Mobile Robot Localization in Indoor Environment", *Pattern Recognition*, 30(1):99-111, 1997.
Dyson's Robot Vacuum Cleaner—the DC06, May 2004, Retrieved from the Internet: URL<http://www.gizmag.com/go/1282/>. Accessed Nov. 2011, 3 pages.
EBay, "Roomba Timer-> Timed Cleaning-Floorvac Robotic Vacuum," Retrieved from the Internet: URL Cgi.ebay.com/ws/eBayISAPI.dll?viewitem&category=43526&item=4375198387&rd=1, 5 pages, Apr. 2005.
Electrolux Trilobite, "Time to enjoy life," Retrieved from the Internet: URL<http://www.robocon.co.kr/trilobite/Presentation_Trilobite_Kor_030104.ppt, 26 pages, accessed Dec. 2011.
Electrolux Trilobite, Jan. 12, 2001, http://www.electroluxui.com:8080/2002%5C822%5C833102EN.pdf, accessed Jul. 2, 2012, 10 pages.
Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.
Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.
Euroflex, Jan. 2006, Retrieved from the Internet: URL<http://www.euroflex.tv/novita_dett.php?id=15, 1 page, accessed Nov. 2011.
Everyday Robots, "Everyday Robots: Reviews, Discussion and News for Consumers," Retrieved from the Internet: URL< www.everydayrobots.com/index.php?option=content&task=view&id=9>. 7 pages, Apr. 2005.
Facchinetti Claudio et al., "Self-Positioning Robot Navigation Using Ceiling Images Sequences," ACCV '95, 5 pages, Dec. 1995.
Facchinetti Claudio et al., "Using and Learning Vision-Based Self-Positioning for Autonomous Robot Navigation," ICARCV '94, vol. 3, pp. 1694-1698, 1994.
Facts on the Trilobite, Retrieved from the Internet: URL< http://www.frc.ri.cmu.edu/~hpm/talks/Extras/trilobite.desc.html >. 2 pages, accessed Nov. 2011.
Fairfield et al., "Mobile Robot Localization with Sparse Landmarks," SPIE vol. 4573, pp. 148-155, 2002.
Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.
Fayman, "Exploiting Process Integration and Composition in the context of Active Vision," IEEE Transactions on Systems, Man, and Cybernetics—Part C: Application and reviews, vol. 29, No. 1, pp. 73-86, Feb. 1999.
Florbot GE Plastics, 1989-1990, 2 pages, available at http://www.fuseid.com/, accessed Sep. 27, 2012.
Franz et al., "Biomimetric robot navigation", Robotics and Autonomous Systems, vol. 30 pp. 133-153, 2000.
Friendly Robotics, "Friendly Robotics-Friendly Vac, Robotic Vacuum Cleaner," Retrieved from the Internet: URL< www.friendlyrobotics.com/vac.htm > 5 pages, Apr. 2005.
Friendly Robotics, Retrieved from the Internet: URL<http://www.robotsandrelax.com/PDFs/RV400Manual.pdf>. 18 pages, accessed Dec. 2011.
Fuentes et al., "Mobile Robotics 1994," University of Rochester. Computer Science Department, TR 588, 44 pages, Dec. 1994.
Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, pp. 1466/1471, Aug. 1995.
Gat, "Robust Low-Computation Sensor-driven Control for Task-Directed Navigation," Proc of IEEE International Conference on Robotics and Automation , Sacramento, CA pp. 2484-2489, Apr. 1991.
Gionis, "A hand-held optical surface scanner for environmental Modeling and Virtual Reality," Virtual Reality World, 16 pages, 1996.
Goncalves et al., "A Visual Front-End for Simultaneous Localization and Mapping", Proceedings of the 2005 IEEE International Conference on Robotics and Automation, Barcelona, Spain, pp. 44-49, Apr. 2005.
Gregg et al., "Autonomous Lawn Care Applications," 2006 Florida Conference on Recent Advances in Robotics, Miami, Florida, May 25-26, 2006, Florida International University, 5 pages.
Grumet, "Robots Clean House," Popular Mechanics, Nov. 2003, 3 pages.
Hamamatsu "SI PIN Diode S5980, S5981 S5870—Multi-element photodiodes for surface mounting," Hamatsu Photonics, 2 pages, Apr. 2004.
Hammacher Schlemmer , "Electrolux Trilobite Robotic Vacuum," Retrieved from the Internet: URL< www.hammacher.com/publish/71579.asp?promo=xsells>. 3 pages, Mar. 2005.
Haralick et al. "Pose Estimation from Corresponding Point Data", *IEEE Transactions on Systems, Man, and Cybernetics*, 19(6):1426-1446, Nov. 1989.
Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.
Hitachi: News release: "The home cleaning robot of the autonomous movement type (experimental machine)," Retrieved from the Internet: URL< www.i4u.com./japanreleases/hitachirobot.htm>. 5 pages, Mar. 2005.
Hoag et al., "Navigation and Guidance in interstellar space," ACTA Astronautica, vol. 2, pp. 513-533 , Feb. 1975.
Huntsberger et al., "CAMPOUT: A Control Architecture for Tightly Coupled Coordination of Multirobot Systems for Planetary Surface Exploration," *IEEE Transactions on Systems, Man, and Cybernetics—Part A: Systems and Humans*, 33(5):550-559, Sep. 2003.
Iirobotics.com, "Samsung Unveils Its Multifunction Robot Vacuum," Retrieved from the Internet: URL<.www.iirobotics.com/webpages/hotstuff.php?ubre=111>. 3 pages, Mar. 2005.
International Search Report issued in International Application No. PCT/US2005/010200, dated Aug. 2, 2005.
International Search Report issued in International Application No. PCT/US2005/010244, dated Aug. 2, 2005.
Japanese Office Action issued in JP Patent Application No. 2007-506413, dated May 26, 2010, (with English translation).
Jarosiewicz et al., "Final Report—Lucid," University of Florida, Departmetn of Electrical and Computer Engineering, EEL 5666—Intelligent Machine Design Laboratory, 50 pages, Aug. 1999.

(56) References Cited

OTHER PUBLICATIONS

Jensfelt et al., "Active Global Localization for a mobile robot using multiple hypothesis tracking," *IEEE Transactions on Robots and Automation*, 17(5): 748-760, Oct. 2001.
Jeong et al., "An intelligent map-building system for indoor mobile robot using low cost photo sensors," *SPIE*, vol. 6042, 6 pages, 2005.
Kahney, "Robot Vacs are in the House," Retrieved from the Internet: URL<www.wired.corn/news/technology/o,1282,59237,00.html>. 6 pages, Jun. 2003.
Karcher "Karcher RoboCleaner RC 3000," Retrieved from the Internet: URL<www.robocleaner.de/english/screen3.html>. 4 pages, Dec. 2003.
Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002, 8 pages.
Karcher USA "RC 3000 Robotics cleaner," : Retrieved from the Internet: URL<www.karcher-usa.com, 3 pages, Mar. 2005.
Karcher USA, RC3000 Robotic Cleaner, website: http://www.karcher-usa.com/showproducts.php?op=view prod¶m1=143 ¶m2=&param3=, 3 pages, accessed Mar. 2005.
Karcher, "Product Manual Download Karch", available at www.karcher.com, 16 pages, 2004.
Karlsson et al, "Core Technologies for service Robotics," IEEE/RSJ International Conference on Intelligent Robots and Systems (IROS 2004), vol. 3, pp. 2979-2984, Sep. 2004.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
King and Weiman, "HelpmateTM Autonomous Mobile Robots Navigation Systems," SPIE vol. 1388 Mobile Robots, pp. 190-198, 1990.
Kleinberg, The Localization Problem for Mobile Robots, Laboratory for Computer Science, Massachusetts Institute of Technology, 1994 IEEE, pp. 521-531, 1994.
Knights, et al., "Localization and Identification of Visual Landmarks," *Journal of Computing Sciences in Colleges*, 16(4):312-313, May 2001.
Kolodko et al., "Experimental System for Real-Time Motion Estimation," Proceedings of the 2003 IEEE/ASME International Conference on Advanced Intelligent Mechatronics (AIM 2003), pp. 981-986, 2003.
Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.
Krotov et al., "Digital Sextant," Downloaded from the internet at: http://www.cs.cmu.edu/~epk/ , 1 page, 1995.
Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.
Kuhl et al., "Self Localization in Environments using Visual Angles," VRCAI '04 Proceedings of the 2004 ACM SIGGRAPH international conference on Virtual Reality continuum and its applications in industry, pp. 472-475, 2004.
Kurs et al, Wireless Power transfer via Strongly Coupled Magnetic Resonances, Downloaded from www.sciencemag.org, Aug. 2007, 5 pages.
Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Lambrinos et al., "A mobile robot employing insect strategies for navigation," Retrieved from the Internet: URL<http://www8.cs.umu.se/kurser/TDBD17/VT04/d1/Assignment%20Papers/lambrinos-RAS-2000.pdf>. 38 pages, Feb. 1999.
Lang et al., "Visual Measurement of Orientation Using Ceiling Features", 1994 IEEE, pp. 552-555, 1994.
Lapin, "Adaptive position estimation for an automated guided vehicle," *SPIE*, vol. 1831 Mobile Robots VII, pp. 82-94, 1992.

LaValle et al., "Robot Motion Planning in a Changing, Partially Predictable Environment," 1994 IEEE International Symposium on Intelligent Control, Columbus, OH, pp. 261-266, Aug. 1994.
Lee et al., "Development of Indoor Navigation system for Humanoid Robot Using Multi-sensors Integration", ION NTM, San Diego, CA pp. 798-805, Jan 2007.
Lee et al., "Localization of a Mobile Robot Using the Image of a Moving Object," *IEEE Transaction on Industrial Electronics*, 50(3):612-619, Jun. 2003.
Leonard et al., "Mobile Robot Localization by tracking Geometric Beacons," *IEEE Transaction on Robotics and Automation*, 7(3):376-382, Jun. 1991.
Li et al. "Robust Statistical Methods for Securing Wireless Localization in Sensor Networks," Information Processing in Sensor Networks, 2005, Fourth International Symposium on, pp. 91-98, Apr. 2005.
Li et al., "Making a Local Map of Indoor Environments by Swiveling a Camera and a Sonar," Proceedings of the 1999 IEEE/RSJ International Conference on Intelligent Robots and Systems, pp. 954-959, 1999.
Lin et al., "Mobile Robot Navigation Using Artificial Landmarks," *Journal of robotics System*, 14(2): 93-106, 1997.
Linde, Dissertation-"On Aspects of Indoor Localization," Available at: https://eldorado.tu-dortmund.de/handle/2003/22854, University of Dortmund, 138 pages, Aug. 2006.
Lumelsky et al., "An Algorithm for Maze Searching with Azimuth Input", 1994 IEEE International Conference on Robotics and Automation, San Diego, CA vol. 1, pp. 111-116, 1994.
Luo et al., "Real-time Area-Covering Operations with Obstacle Avoidance for Cleaning Robots," IEEE, pp. 2359-2364, 2002.
Madsen et al., "Optimal landmark selection for triangulation of robot position," Journal of Robotics and Autonomous Systems, vol. 13 pp. 277-292, 1998.
Martishevcky, "The Accuracy of point light target coordinate determination by dissectoral tracking system", SPIE vol. 2591, pp. 25-30, Oct. 23, 2005.
Matsumura Camera Online Shop: Retrieved from the Internet: URL<http://www.rakuten.co.jp/matsucame/587179/711512/>. Accessed Nov. 2011, 7 pages.
Matsutek Enterprises Co. Ltd, "Automatic Rechargeable Vacuum Cleaner," http://matsutek.manufacturer.globalsources.com/si/6008801427181/pdtl/Home-vacuum/10 . . . , Apr. 2007, 3 pages.
McGillem et al., "Infra-red Lacation System for Navigation and Autonomous Vehicles," 1988 IEEE International Conference on Robotics and Automation, vol. 2, pp. 1236-1238, Apr. 1988.
McGillem,et al. "A Beacon Navigation Method for Autonomous Vehicles," *IEEE Transactions on Vehicular Technology*, 38(3):132-139, Aug. 1989.
McLurkin "Stupid Robot Tricks: A Behavior-based Distributed Algorithm Library for Programming Swarms of Robots," Paper submitted for requirements of BSEE at MIT, May 2004, 127 pages.
McLurkin, "The Ants: A community of Microrobots," Paper submitted for requirements of BSEE at MIT, May 1995, 60 pages.
Miro et al., "Towards Vision Based Navigation in Large Indoor Environments," Proceedings of the IEEE/RSJ International.
MobileMag, "Samsung Unveils High-tech Robot Vacuum Cleaner," Retrieved from the Internet: URL<http://www.mobilemag.com/content/100/102/C2261/>. 4 pages, Mar. 2005.
Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.
Moore et al., "A simple Map-bases Localization strategy using range measurements," *SPIE*, vol. 5804 pp. 612-620, 2005.
Morland,"Autonomous Lawnmower Control", Downloaded from the internet at: http://cns.bu.edu/~cjmorlan/robotics/lawnmower/report.pdf, 10 pages, Jul. 2002.
Munich et al., "ERSP: A Software Platform and Architecture for the Service Robotics Industry," Intelligent Robots and Systems, 2005. (IROS 2005), pp. 460-467, Aug. 2005.
Munich et al., "SIFT-ing Through Features with ViPR", IEEE Robotics & Automation Magazine, pp. 72-77, Sep. 2006.

(56) References Cited

OTHER PUBLICATIONS

Nam et al., "Real-Time Dynamic Visual Tracking Using PSD Sensors and extended Trapezoidal Motion Planning", Applied Intelligence 10, pp. 53-70, 1999.
Nitu et al., "Optomechatronic System for Position Detection of a Mobile Mini-Robot," *IEEE Ttransactions on Industrial Electronics*, 52(4):969-973, Aug. 2005.
On Robo, "Robot Reviews Samsung Robot Vacuum (VC-RP30W)," Retrieved from the Internet: URL <www.onrobo.com/reviews/AT_Home/vacuum_cleaners/on00verb30rosam/index.htm>. 2 pages, 2005.
On Robo, "Robot Reviews Samsung Robot Vacuum (VC-RP30W)," Retrieved from the Internet: URL <www.onrobo.com/reviews/AT_Home/vacuum_cleaners/on00verb30rosam/index.htm>. 2 pages, 2005.
OnRobo "Samsung Unveils Its Multifunction Robot Vacuum," Retrieved from the Internet: URL <www.onrobo.com/enews/0210/samsung_vacuum.shtml>. 3 pages, Mar. 2005.
Pages et al., "A camera-projector system for robot positioning by visual serving," Proceedings of the 2006 Conference on Computer Vision and Pattern Recognition Workshop (CVPRW06), 8 pages, Jun. 2006.
Pages et al., "Robust decoupled visual servoing based on structured light," 2005 IEEE/RSJ, Int. Conf. on Intelligent Robots and Systems, pp. 2676-2681, 2005.
Park et al., "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun./Jul. 1994.
Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.
Pirjanian et al., "A decision-theoretic approach to fuzzy behavior coordination", 1999 IEEE International Symposium on Computational Intelligence in Robotics and Automation, 1999. CIRA '99., Monterey, CA, pp. 101-106, Nov. 1999.
Pirjanian et al., "Distributed Control for a Modular, Reconfigurable Cliff Robot," Proceedings of the 2002 IEEE International Conference on Robotics & Automation, Washington, D.C. pp. 4083-4088, May 2002.
Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.
Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.
Pirjanian, "Challenges for Standards for consumer Robotics," IEEE Workshop on Advanced Robotics and its Social impacts, pp. 260-264, Jun. 2005.
Prassler et al., "A Short History of Cleaning Robots," Autonomous Robots 9, 211-226, 2000, 16 pages.
Put Your Roomba . . . On, Automatic webpages: http://www.acomputeredge.com/roomba, 5 pages, accessed Apr. 2005.
Remazeilles et al., "Image based robot navigation in 3D environments," Proc. of *SPIE*, vol. 6052, pp. 1-14, Dec. 2005.
Rives et al., "Visual servoing based on ellipse features," *SPIE*, vol. 2056 Intelligent Robots and Computer Vision pp. 356-367, 1993.
Roboking—not just a vacuum cleaner, a robot!, Jan. 21, 2004, infocom.uz/2004/01/21/robokingne-prosto-pyilesos-a-robot/, accessed Oct. 10, 2011, 7 pages.
RoboMaid Sweeps Your Floors So You Won't Have to, the Official Site, website: Retrieved from the Internet: URL<http://therobomaid.com>. 2 pages, accessed Mar. 2005.
Robot Buying Guide, "LG announces the first robotic vacuum cleaner for Korea," Retrieved from the Internet: URL<http://robotbg.com/news/2003/04/22/lg_announces_the_first_robotic_vacu>. 1 page, Apr. 2003.
Ronnback, "On Methods for Assistive Mobile Robots," Retrieved from the Internet: URL<http://www.openthesis.org/documents/methods-assistive-mobile-robots-595019.html>. 218 pages, Jan. 2006.
Roth-Tabak et al., "Environment Model for mobile Robots Indoor Navigation," *SPIE*, vol. 1388 Mobile Robots, pp. 453-463, 1990.
Sahin et al., "Development of a Visual Object Localization Module for Mobile Robots," 1999 Third European Workshop on Advanced Mobile Robots, (Eurobot '99), pp. 65-72, 1999.
Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.
Sato, "Range Imaging Based on Moving Pattern Light and Spatio-Temporal Matched Filter," Proceedings International Conference on Image Processing, vol. 1., Lausanne, Switzerland, pp. 33-36, Sep. 1996.
Schenker et al., "Lightweight rovers for Mars science exploration and sample return," Intelligent Robots and Computer Vision XVI, *SPIE* Proc. 3208, pp. 24-36, 1997.
Schofield, "Neither Master nor slave-A Practical Study in the Development and Employment of Cleaning Robots, Emerging Technologies and Factory Automation," 1999 Proceedings ETFA '99 1999 7th IEEE International Conference on Barcelona, Spain, pp. 1427-1434, Oct. 1999.
Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim et al, "Learning Visual Landmarks for Pose Estimation," IEEE International Conference on Robotics and Automation, vol. 3, Detroit, MI, pp. 1972-1978, May 1999.
Sobh et al., "Case Studies in Web-Controlled Devices and Remote Manipulation," Automation Congress, 2002 Proceedings of the 5th Biannual World, pp. 435-440, Dec. 2002.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.
Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
SVET Computers—New Technologies—Robot Vacuum Cleaner, Oct. 1999, available at http://www.sk.rs/1999/10/sknt01.html, 1 page, accessed Nov. 1, 2011.
Taipei Times, "Robotic vacuum by Matsuhita about to undergo testing," Retrieved from the Internet: URL<http://www.taipeitimes.com/News/worldbiz/archives/2002/03/26/0000129338>. accessed Mar. 2002, 2 pages.
Teller, "Pervasive pose awareness for people, Objects and Robots," http://www.ai.mit.edu/lab/dangerous-ideas/Spring2003/teller-pose.pdf, 6 pages, Apr. 2003.
Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.
The Sharper Image, eVac Robotic Vacuum—Product Details, www.sharperiamge.com/us/en/templates/products/pipmoreworklprintable.jhtml, 1 page, Mar. 2005.
TheRobotStore.com, "Friendly Robotics Robotic Vacuum RV400—The Robot Store," www.therobotstore.com/s.nl/sc.9/category.-109/it.A/id.43/.f, 1 page, Apr. 2005.
Thrun, "Learning Occupancy Grid Maps With Forward Sensor Models," Autonomous Robots 15, 28 pages, Sep. 1, 2003.

(56) References Cited

OTHER PUBLICATIONS

Thrun, Sebastian, "Learning Occupancy Grid Maps With Forward Sensor Models," Autonomous Robots 15, 28 pages, Sep. 1, 2003.

Trebi-Ollennu et al., "Mars Rover Pair Cooperatively Transporting a Long Payload," Proceedings of the 2002 IEEE International Conference on Robotics & Automation, Washington, D.C. pp. 3136-3141, May 2002.

Tribelhorn et al., "Evaluating the Roomba: A low-cost, ubiquitous platform for robotics research and education," *IEEE*, pp. 1393-1399, 2007.

Tse et al., "Design of a Navigation System for a Household Mobile Robot Using Neural Networks," Department of Manufacturing Engg. & Engg. Management, City University of Hong Kong, pp. 2151-2156, 1998.

UBOT, cleaning robot capable of wiping with a wet duster, Retrieved from the Internet: URL<http://us.aving.net/news/view.php?articleId=23031>. 4 pages, accessed Nov. 2011.

Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.

Watts, "Robot, boldly goes where no man can," The Times—pp. 20, Jan. 1985.

Wijk et al., "Triangulation-Based Fusion of Sonar Data with Application in Robot Pose Tracking," *IEEE Transactions on Robotics and Automation*, 16(6):740-752, Dec. 2000.

Wolf et al., "Robust Vision-Based Localization by Combining an Image-Retrieval System with Monte Carol Localization,", *IEEE Transactions on Robotics*, 21(2):208-216, Apr. 2005.

Wolf et al., "Robust Vision-based Localization for Mobile Robots Using an Image Retrieval System Based on Invariant Features," Proceedings of the 2002 IEEE International Conference on Robotics & Automation, Washington, D.C., pp. 359-365, May 2002.

Wong, "EIED Online>> Robot Business", ED Online ID# 13114, 17 pages, Jul. 2006.

Yamamoto et al., "Optical Sensing for Robot Perception and Localization," 2005 IEEE Workshop on Advanced Robotics and its Social Impacts, pp. 14-17, 2005.

Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.

Yujin Robotics,"An intelligent cleaning robot," Retrieved from the Internet: URL<http://us.aving.net/news/view.php?articleId=7257>. 8 pages, accessed Nov. 2011.

Yun et al., "Image-Based Absolute Positioning System for Mobile Robot Navigation," IAPR International Workshops SSPR Hong Kong, pp. 261-269, Aug. 2006.

Yun et al., "Robust Positioning a Mobile Robot with Active Beacon Sensors," *Lecture Notes in Computer Science*, 2006, vol. 4251, pp. 890-897, 2006.

Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.

Zha et al., "Mobile Robot Localization Using Incomplete Maps for Change Detection in a Dynamic Environment," Advanced Intelligent Mechatronics '97. Final Program and Abstracts., IEEE/ASME International Conference, pp. 110, Jun. 1997.

Zhang et al., "A Novel Mobile Robot Localization Based on Vision," *SPIE* vol. 6279, 6 pages, Jan. 2007.

\* cited by examiner

METHODS AND APPARATUS FOR POSITION ESTIMATION USING REFLECTED LIGHT SOURCES

RELATED APPLICATION

This application claims the benefit under 35 U.S.C. §119(e) of U.S. Provisional Application No. 60/557,252, filed Mar. 29, 2004, the entirety of which is hereby incorporated by reference.

APPENDIX A

Appendix A, which forms a part of this disclosure, is a list of commonly owned co-pending U.S. patent applications. Each one of the co-pending applications listed in Appendix A is hereby incorporated herein in its entirety by reference thereto.

BACKGROUND OF THE INVENTION

1. Field of the Invention

This invention generally relates to the estimation of position and orientation of an object with respect to a local or a global coordinate system. In particular, the invention relates to the method and apparatus that provides estimation and tracking of the position and orientation. The method and apparatus that can be used in vehicles, such as in mobile robots.

2. Description of the Related Art

Position estimation is a topic of interest for a wide variety of application areas ranging from autonomous mobile robots, ubiquitous computing, mobile devices, tracking of assets, tracking of people, position tracking of customers in a store, tracking of pets, position of nodes in ad hoc wireless networks, position tracking of vehicles, and position tracking of mobile devices such as cell phones, personal digital assistants, and the like.

Robots are becoming more and more commonplace in society. It will be understood that these robots can be embodied in a variety of forms, such as in automated floor care products such as vacuum cleaners. A variety of applications can be found for mobile robots, such as, but not limited to, entertainment applications such as toy robots, healthcare applications such as elderly care robots, patrolling and security applications, telepresence robots, cleaning applications such as floor cleaning robots, utility applications in environments that are unfriendly to humans such as space, deep water, cold temperature, radiation, chemical exposure, biohazards, etc., dangerous tasks such as defusing of potential explosives, operation in confined spaces such as collapsed buildings, and the performance of menial tasks such as cleaning. Mobile robots, robots that can move from one location to another, often use knowledge of their position relative to their environment.

Localization techniques refer to processes by which a robot determines its position and orientation relative to a reference coordinate system. The reference coordinate system can be either local (for example, relative to an object of interest) or global. Position estimation can include estimation of any quantity that is related to at least some of an object's six degrees of freedom of in three dimensions (3-D). These six degrees of freedom can be described as the object's (x,y,z) position and its angles of rotation around each axis of a 3-D coordinate system, which angles are denoted $\alpha$, $\beta$, and $\theta$ and respectively termed "pitch," "roll," and "yaw." Such position estimation can be useful for various tasks and application. For example, the bearing of a robot relative to a charging station can be useful for allowing the robot to servo to the charging station and recharge its batteries autonomously. The estimation of the distance of a pet from the front door can be used to alert the owner about a possible problem. For indoor environments, it is typically desired to track the (x,y) position of an object in a two-dimensional (2-D) floor plane and its orientation, $\theta$, relative to an axis normal to the floor plane. That is, it can be convenient to assume that a z coordinate of the robot, as well as the robot's roll and pitch angles, are constant. The (x,y) position and the $\theta$ orientation of an object are referred to together as the pose of the object.

Numerous devices, processes, sensors, equipment, and mechanisms have been proposed for position estimation. These methods can be divided into two main categories. One category uses beacons in the environment to enable position estimation, and the second category uses natural landmarks in the environment. Because the method and apparatus described herein fall into the first category of beacon-based position estimation or localization, this section will focus on beacon-based localization methods.

Beacons are artificial devices in the environment that can be detected by an appropriate sensing apparatus. Beacons can be passive or active. Examples of passive beacons include retroreflective materials. By projecting a light source onto a retroreflective material, one can create a signature or signal that can be detected readily using one or more appropriate optical sensors. Using the signature or signal, the one or more sensors can determine their positions relative to the beacons and/or relative to the environment.

Active optical beacons emit light that can be detected by an optical sensor. The optical sensor can measure various characteristics of the emitted light, such as the distance to the emitter (using time-of-flight), the bearing to the emitter, the signal strength, and the like. Using such characteristics, one can estimate the position of the sensor using an appropriate technique, such as triangulation or trilateration. These approaches, which use active optical beacons paired with optical sensors, are disadvantageously constrained by line-of-sight between the emitters and the sensors. Without line-of-sight, a sensor will not be able to detect the emitter.

SUMMARY OF THE INVENTION

Embodiments described herein are related to methods and apparatus for the estimation of the position and orientation of a device, such as a robot, relative to a global or local reference frame. The apparatus described herein comprises an optical sensor, an optical emitter, and associated signal processing circuitry. The poses of the sensors are typically unknown, and the apparatus and methods described herein can be used to measure or estimate the pose of at least one sensor and the position of an emitter projection on a surface.

A typical application of the method and apparatus includes estimation and tracking of the position of a mobile autonomous robot. Other applications include estimation and tracking of an object for position-aware, ubiquitous devices. Additional applications include tracking of the positions of people or pets in an indoor environment. The methods and apparatus comprise one or more optical emitters, one or more optical sensors, signal processing circuitry, and signal processing methods to determine the position and orientation of at least one of the optical sensors based at least in part on the detection of the signal of one or more emitted light sources reflected from a surface.

BRIEF DESCRIPTION OF THE DRAWINGS

These and other features of the invention will now be described with reference to the drawings summarized below.

These drawings (not to scale) and the associated descriptions are provided to illustrate preferred embodiments of the invention and are not intended to limit the scope of the invention.

GLOSSARY OF TERMS

Figure 1:
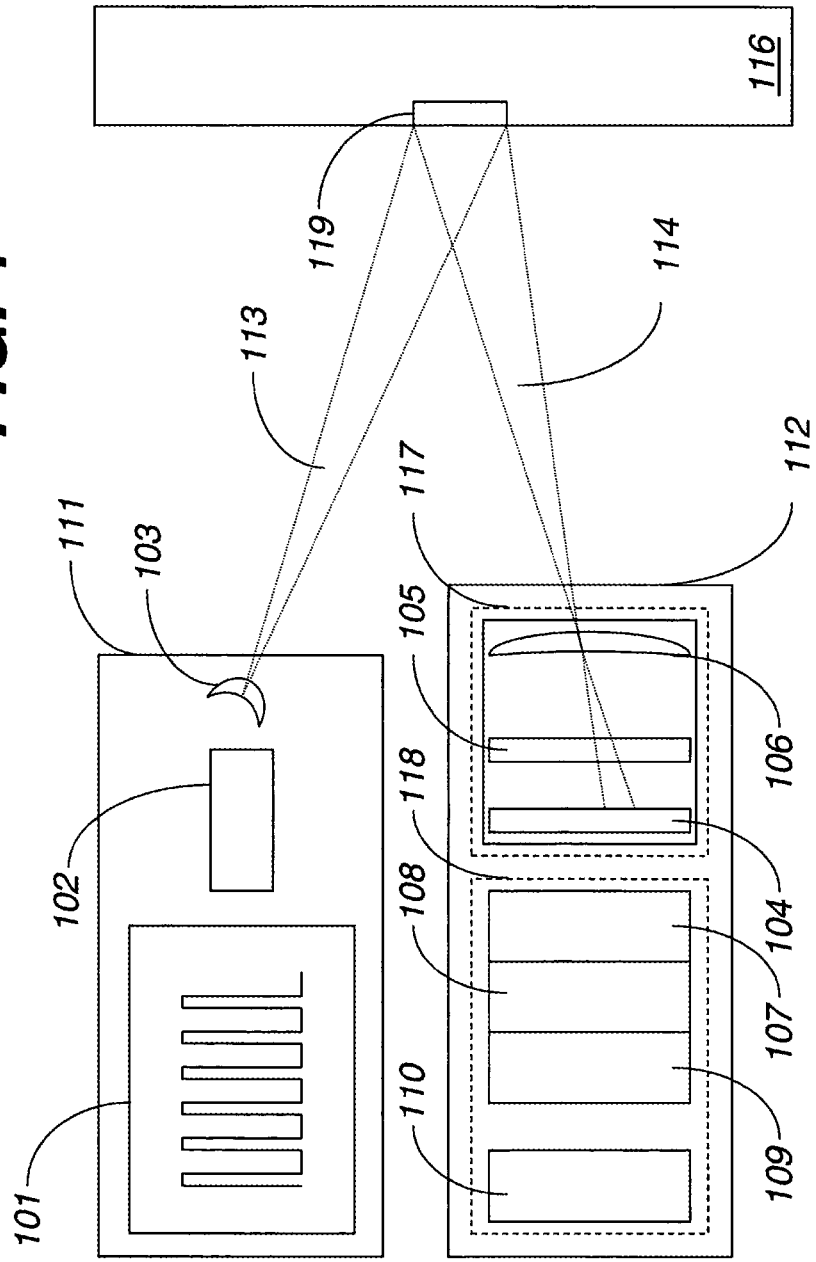
FIG. 1 is a block diagram illustrating one implementation of an apparatus for position estimation.

Pose: A pose is a position and orientation in space. In three dimensions, pose can refer to a position (x,y,z) and an orientation ($\alpha$, $\beta$, $\theta$) with respect to the axes of the three-dimensional space. In two dimensions, pose can refer to a position (x,y) in a plane and an orientation $\theta$ relative to the normal to the plane.

Optical sensor: An optical sensor is a sensor that uses light to detect a condition and describe the condition quantitatively. In general, an optical sensor refers to a sensor that can measure one or more physical characteristics of a light source. Such physical characteristics can include the number of photons, the position of the light on the sensor, the color of the light, and the like.

Position-sensitive detector: A position-sensitive detector, also known as a position sensing detector or a PSD, is an optical sensor that can measure the centroid of an incident light source, typically in one or two dimensions. For example, a PSD can convert an incident light spot into relatively continuous position data.

Imager: An imager refers to an optical sensor that can measure light on an active area of the sensor and can measure optical signals along at least one axis or dimension. For example, a photo array can be defined as a one-dimensional imager, and a duo-lateral PSD can be defined as a two-dimensional imager.

Camera: A camera typically refers to a device including one or more imagers, one or more lenses, and associated support circuitry. Optionally, a camera can also include one or more optical filters and a housing or casing.

PSD camera: A PSD camera is a camera that uses a PSD.

Projector: A projector refers to an apparatus that projects light. A projector includes an emitter, a power source, and associated support circuitry. A projector can project one or more light spots on a surface.

Spot: A spot refers to a projection of light on a surface. A spot can correspond to an entire projection, or can correspond to only part of an entire projection.

Optical position sensor: An optical position sensor is a device that includes one or more cameras, a signal processing unit, a power supply, and support circuitry and can estimate its position, distance, angle, or pose relative to one or more spots.

DETAILED DESCRIPTION OF PREFERRED EMBODIMENTS

Although these methods and apparatus will be described in terms of certain preferred embodiments, other embodiments that are apparent to those of ordinary skill in the art, including embodiments that do not provide all of the benefits and features set forth herein, are also within the scope of the invention Embodiments advantageously use active optical beacons in position estimation. Advantageously, disclosed techniques minimize or reduce the line-of-sight limitation of conventional active optical beacon-based localization by projecting the light sources onto a surface that is observable from a relatively large portion of the environment. It will be understood that the light sources can include sources of light that are not visible to the naked eye, such as, for example, infrared (IR) sources. For example, in an indoor environment, it can be advantageous to project the emitted light from the beacon onto the ceiling. In many indoor environments, the ceiling of a room is observable from most locations with the room.

As an illustration, one can consider an application of the method and apparatus for an autonomous mobile robot such as a robotic vacuum cleaner. A common approach to self-docking and self-charging is to place active infrared (IR) beacons on the charging station, which the robot can sense with photo detectors, and use the associated sensory information to find the docking station. This approach suffers from line-of-sight limitations. If the robot and the docking station do not have line-of-sight separation, the robot cannot find its position relative to the docking station.

In one embodiment, the IR emitter can advantageously be placed in such a way that it projects onto the ceiling above the docking station, and a robot can have a photo detector that generally faces the ceiling or is capable of observing the ceiling. The robot can advantageously observe the IR projection on the ceiling even in the absence of line-of-sight separation between the robot and the docking station. In relatively many situations, the robot has a line-of-sight view of the ceiling, which enables the robot to detect the IR projection and move to the docking station for self-charging.

The method and apparatus described herein include numerous variations that differ in the type and number of active beacons used, differ in the type and number of optical sensors used for detection of reflected light, and differ in the type of signal processing used to determine the pose of an object. Embodiments of the method and apparatus include systems for estimation of the distance of an object relative to another object, estimation of the bearing of an object relative to another object, estimation of the (x,y) position of an object in a two-dimensional plane, estimation of the (x,y,z) position of an object in three-dimensional space, estimation of the position and orientation of an object in two dimensions or in three dimensions, estimation of the linear or angular velocity of an object, and estimation of the linear or angular acceleration of an object.

Embodiments of the method and apparatus are related to estimation of the position and orientation of a device, such as a mobile robot, relative to a global or a local coordinate system. The apparatus includes one or more optical sensors, one or more optical emitters, and signal processing circuitry. The initial position and orientations of the sensors can be unknown, and the apparatus and methods can be used to measure or estimate the position and orientation of one or more of the sensors and the position of the emitter projections on a surface.

In one embodiment, an optical sensor measures the optical signals generated by the optical emitters that are within the sensor's field of view by measuring the light that is projected onto a surface. By contrast, in a conventional system, such optical devices for distance or position measurement disadvantageously require line-of-sight between the emitter and the sensor. Advantageously, embodiments described herein can detect optical signals projected onto a surface, such as a ceiling of an indoor environment. The optical emitters can be configured to project one or more spots of light onto a surface that is observable by a sensor from a relatively large portion of the environment. The sensor detects the spot and estimates the sensor's position relative to the spot. The sensor can measure quantities such as the position of the spot in the sensor's reference frame and the intensity of the signal generated by the spot, and can associate a unique identifier with each spot. Each such measurement or set of measurements defines a relationship between the position of the sensor and the position of the spot. Using multiple such relationships defined between one or more sensors and one or more spots, signal processing circuitry can estimate the pose of at least one of the sensors, and, optionally, the position of one or more spots.

Embodiments of the method and apparatus described herein can vary in the number and type of optical sensors used, can vary in the number and type of optical emitters used, can vary in the projection of the light onto the sensor via, optionally, one or more spots, and can vary in the methods used for estimation of the distance, heading, position, orientation, velocity, angular velocity, acceleration, and angular acceleration of the sensor or sensors. For example, a light spot can be generated by an IR sensor that emits IR light onto a surface, and a photo detector can be used to detect the light reflected from the surface. With one emitter and one sensor, the distance and relative heading to the projected light can be measured. With two emitters and one two-dimensional sensor, the position of the sensor in a plane and the rotation of the sensor around an axis normal to that plane can be measured.

Embodiments of the method and apparatus described herein can use a wide variety of optical sensors. Some embodiments use digital or analog imaging or video cameras, such as CMOS imagers, CCD imagers, and the like. Other embodiments use PSDs, such as one-dimensional PSDs, angular one-dimensional PSDs, two-dimensional PSDs, quad PSDs, duo-lateral PSDs, tetra-lateral PSDs, and the like. Other embodiments use photo detectors.

In one embodiment, the optical sensor is combined with a lens and one or more optical filters to form a camera. For example, a PSD sensor can be enclosed in a casing with an open side that fits the lens and optical filters to filter incoming light and reduce effects of ambient light.

Embodiments of the method and apparatus described herein can also use a wide variety of optical emitters, including visible light devices, invisible light devices, laser light devices, infrared light devices, polarized light devices, light-emitting diodes (LEDs), laser diodes, light bulbs, halogen lights, projectors, and the like.

One embodiment of the method and apparatus described herein uses one two-dimensional PSD camera and a plurality of infrared (IR) emitters. Each IR emitter projects a spot onto the ceiling in a room. Each emitter is modulated with a unique pattern or frequency. The PSD camera is mounted, on a robot, for example, and faces the ceiling in such a way that its field of view intersects at least a portion of the plane that defines the ceiling onto which the spots are projected. The PSD camera provides an indication of the projected position of each observable spot in the camera sensor coordinates. In the illustrated embodiment, the position of each observed spot is defined as its centroid.

A camera position of each observed spot can correspond to the projection of a spot's position onto the image plane of the camera as defined by a corresponding perspective transformation. The PSD camera can measure the camera position of each spot. Using the measured camera positions of the spot and information related to the distance between the spots, the position (x,y) of the PSD camera in one plane and the rotation (θ) of the PSD camera around an axis normal to that plane can be determined. The position and orientation of the camera defined by (x, y, θ) is known as the pose of the camera.

For example, the PSD camera can be coupled to a mobile device such as a robot, and the device's pose can advantageously be relatively accurately determined within a room with two or more spots. Pose estimation, also known as localization, is an important component in many applications, including automated vacuuming, automated floor cleaning, telepresence, security, and entertainment. Without accurate position estimates, it is relatively difficult or impossible for a conventional robot to execute a path or trajectory because the conventional robot's internal position estimate tends to drift, and the conventional robot is generally unable to measure or account for the drift. For systematic floor coverage in a robotic vacuum cleaner, for example, a conventional robot without the ability to localize generally cannot maintain knowledge of the areas it has cleaned and the areas it has not cleaned, and the robot is therefore relatively likely to clean the same areas repeatedly and inefficiently and is relatively unlikely to clean other areas with sufficient frequency. Accordingly, many conventional robotic vacuum cleaners execute a random trajectory. By contrast, a robotic vacuum cleaner according to an embodiment with the ability to localize in a relatively accurate manner can follow a relatively efficient planned path. A robotic vacuum cleaner according to an embodiment can clean a room in a relatively efficient manner because it can track its path and can execute a planned, traversable path. Similarly, a mobile robot with the ability to localize can navigate to a desirable location and maintain a history of paths that it has taken.

Another embodiment of the method and apparatus described herein uses one two-dimensional PSD camera and one IR emitter. The IR emitter projects a spot on the ceiling, and the PSD camera faces the ceiling such that its field of view intersects at least a portion of the plane that defines the ceiling onto which the spot is projected. The PSD camera can provide indications for a measurement of the distance from the camera to the spot and the heading from the camera to the spot relative to the tangent of the circle with radius defined by the distance measurement. The distance measurement defines a circle centered at the spot projected onto the plane of the camera. In one example, the illustrated embodiment can be used for an application in which it is desired to position a device relative to the spot. Advantageously, when the camera is underneath the spot on the ceiling, then the camera position is at the center of the PSD camera. For example, if the spot is projected over a charging station, a mobile device can approach the charging station and recharge autonomously. In a related embodiment that further comprises wheel encoders, a robotic vacuum cleaner can move along concentric circles or move along a spiral to implement a floor coverage strategy that is relatively efficient, compared to a random coverage strategy.

While various embodiments have been and will be further described in the context of autonomous mobile robots, it will be understood by those of ordinary skill in the art that the principles and advantages set forth herein are applicable to other applications that benefit from position estimation, which are also within the scope of the invention.

DETAIL DESCRIPTIONS OF DRAWINGS

Examples of embodiments will now be described. FIG. 1 illustrates a block diagram of components of one embodiment of an apparatus. The apparatus includes a projector 111 and an optical position sensor 112. The projector 111 emits a light pattern 113 onto a surface 116, which creates a projected light pattern 119. In one embodiment, the light pattern 113 is modulated. The reflection 114 of the projected light pattern 119 is projected onto the optical position sensor 112.

The projector 111 includes a light source 102. By way of example, the light source 102 can correspond to a device, such as a laser device, an infrared device, and the like, that can be modulated by a modulator 101. Optionally, the light from the light source 102 can pass through one or more lenses 103 to project the light onto the surface 116.

The optical position sensor 112 includes a camera 117 and a processing unit 118. The camera 117 can detect and measure the intensity and position of the light 114 reflected from the surface 116 and can generate corresponding signals that are processed by the signal processing unit 118 to estimate the position of the optical position sensor 112 relative to the projected light pattern 119. It will be understood that the optical position sensor 112 can include multiple cameras 117 and/or multiple processing units 118.

The camera 117 includes an imager 104. The imager 104 can, for example, correspond to a CMOS imager, a CCD imager, an infrared imager, and the like. The camera can optionally include an optical filter 105 and can optionally include a lens 106. The lens 106 can correspond to a normal lens or can correspond to a special lens, such as a wide-angle lens, a fish-eye lens, an omni-directional lens, and the like. Further, the lens 106 can include reflective surfaces, such as planar, parabolic, or conical mirrors, which can be used to provide a relatively large field of view or multiple viewpoints. The lens 106 collects the reflected light 114 and projects it onto the imager 104. The optical filter 105 can constrain the wavelengths of light that pass from the lens 106 to the imager 104, which can advantageously be used to reduce the effect of ambient light, to narrow the range of light to match the wavelength of the light coming from the projector 111, and/or to limit the amount of light projected onto the imager 104, which can limit the effects of over-exposure or saturation. The filter 105 can be placed in front of the lens 106 or behind the lens 106. It will be understood that the camera 117 can include multiple imagers 104, multiple optical filters 105, and/or multiple lenses 106.

The signal processing unit 118 can include analog components and can include digital components for processing the signals generated by the camera 117. The major components of the signal processing unit 118 preferably include an amplifier 107, a filter 108, an analog-to-digital converter 109, and a microprocessor 110, such as a peripheral interface controller, also known as a PIC. It will be understood that the signal processing unit 118 can include multiple filters 108 and/or multiple microprocessors 110.

Embodiments of the apparatus are not constrained to the specific implementations of the projector 111 or the optical position sensor 112 described herein. Other implementations, embodiments, and modifications of the apparatus that do not depart from the true spirit and scope of the apparatus will be readily apparent to one of ordinary skill in the art.

Figure 2:
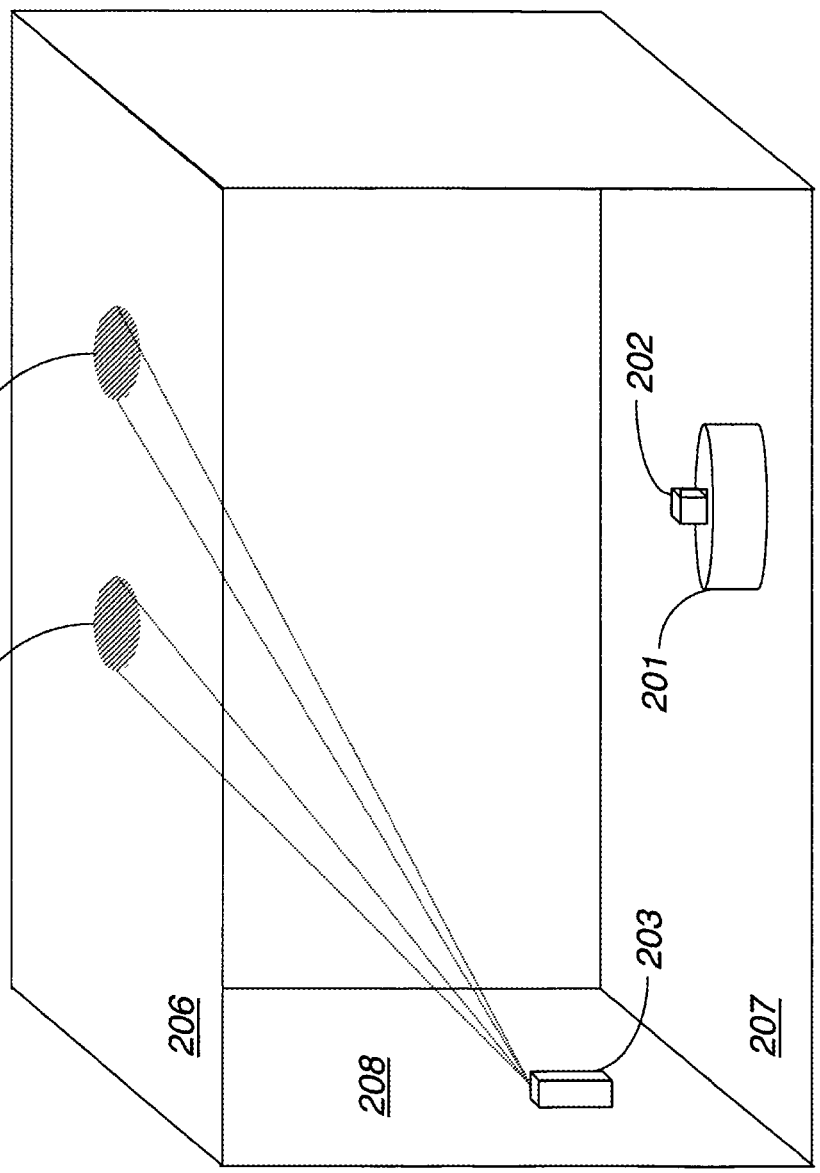
FIG. 2 illustrates an example of a use for the position estimation techniques.

FIG. 2 illustrates an example of a use for the position estimation techniques. An environment includes a ceiling 206, a floor 207, and one or more walls 208. In the illustrated environment, a projector 203 is attached to a wall 208. It will be understood that the projector 203 can have an internal power source, can plug into a wall outlet or both. The projector 203 projects a first spot 204 and a second spot 205 onto the ceiling 206. An optical position sensor 202 is attached to a robot 201. The optical position sensor 202 can detect the spots 204, 205 on the ceiling 206 and measure the position (x,y) of the robot 201 on the floor plane and the orientation θ of the robot 201 with respect to the normal to the floor plane. In one embodiment, the pose of the robot 201 is measured relative to a global coordinate system.

Figure 3:
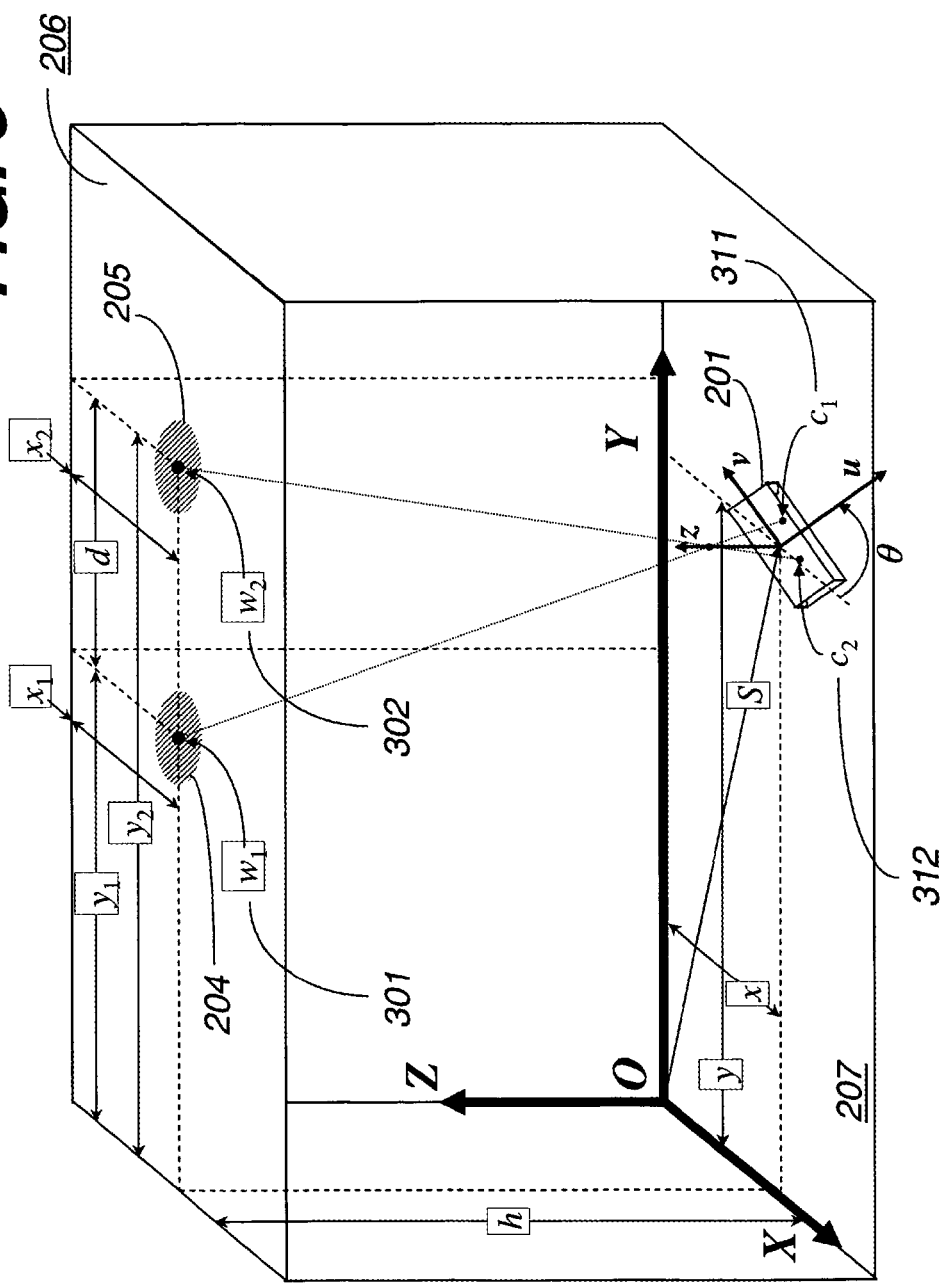
FIG. 3 illustrates a geometrical model associated with one embodiment.

FIG. 3 describes a geometrical model associated with one embodiment of the method and apparatus described earlier in connection with FIG. 2. The ceiling 206 lies at a height h above the floor 207. A point $w_1$ 301 lies at the centroid of the first spot 204, and a point $w_2$ 302 lies at the centroid of the second spot 205. In the illustrated embodiment, a global coordinate system with an X axis, a Y axis, and a Z axis is defined and is also referred to as the global reference frame.

In one embodiment, it is convenient to define the Y axis such that the Y axis is parallel to the vector originating at the point $w_1$ 301 and passing through the point $w_2$ 302. Additionally, it is convenient to define the X axis such that the X axis is perpendicular to the Y axis and lies in the plane defined by the floor. Further, it is convenient to define the Z axis such that the positive Z direction is specified by the cross product of the unit vector in the X direction with the unit vector in the Y direction; in standard vector calculus notation, this relationship is expressed as $\hat{Z}=\hat{X}\times\hat{Y}$. Thus, in the illustrated coordinate system, the Z axis is normal to the floor plane and is directed from the floor to the ceiling. In the global coordinate system, an origin O is defined as the point having coordinates $(0, 0, 0)$. Also in the global coordinate system, the point $w_1$ 301 is defined as having coordinates $(x_1, y_1, h)$, and the point $w_2$ 302 is defined as having coordinates $(x_2, y_2, h)$. Further, it is convenient to assume that the origin O is located directly below the point $w_1$ 301, so that $x_1=0$ and $y_1=0$. Additionally, the definition of the X axis implies that $x_2=0$ as well. Thus, the point $w_1$ 301 has the coordinates $(0, 0, h)$, and the point $w_2$ 302 has the coordinates $(0, y_2, h)$. It will be understood that the aforementioned definitions can be made with no loss of generality.

A coordinate system relative to an imager is defined with a u axis, a v axis, and a z axis and can be referred to as the camera coordinate system or the camera reference frame. In the illustrated embodiment, the imager corresponds to a two-dimensional PSD sensor. In one embodiment, the height of the PSD sensor off the floor plane is relatively small compared to the ceiling height h, so the PSD sensor and the origin of the camera coordinate system use the coordinates $(x, y, 0)$ and the orientation θ in the global coordinate system. The displacement from the origin of the global coordinate system to the origin of the camera coordinate system is denoted S; thus, $\|S\|=\sqrt{x^2+y^2}$, where $\|S\|$ denotes the norm, or magnitude, of the vector S. The point $c_1$ 311 represents the projection of the point $w_1$ 301 onto the imager, and the point $c_2$ 312 represents the projection of the point $w_2$ 302 onto the imager. The point $c_1$ 311 has the coordinates $(u_1, v_1, 0)$ in the camera reference frame, and the point $c_2$ 312 has the coordinates $(u_2, v_2, 0)$ in the camera reference frame. It will be understood that the aforementioned definitions can be made with no loss of generality.

In one embodiment, the spots 204, 205 can be identified using unique signals or unique signatures. For example, the emitters that produce the spots 204, 205 can be on-off modulated with different frequencies. The emitter that produces the first spot 204 can be modulated with a first frequency $f_1$, and the emitter that produces the second spot 205 can be modulated with a second frequency $f_2$, wherein the first frequency and the second frequency are different; that is $f_1 \neq f_2$.

At this point, it should be noted that the ceiling height h and the separation $y_2$ between the point $w_1$ 301 and the point $w_2$ 302 can be determined in a variety of ways. For example, if the mobile robot 201 using the optical position sensor is capable of producing wheel odometry estimates, then the robot 201 can estimate h and $y_2$ using measurements or observations of the points $w_1$ 301 and $w_2$ 302 from multiple positions. Other appropriate techniques will be readily determined by one of ordinary skill in the art.

Exemplary Position Estimation Using the Method and Apparatus

With reference to the coordinate systems, distances, angles, and points described earlier in connection with FIG. 3, the PSD camera can measure $c_1$ and $c_2$, which correspond to the projections of $w_1$ and $w_2$ onto the PSD sensor. In one embodiment, a goal of the method is to determine S, the position of the PSD camera in the global reference frame.

In one embodiment, the PSD measures the coordinates of the centroid of the light projected onto the PSD by generating electrical current proportional to the position and intensity of the light centroid. The associated processing can be accomplished in a wide variety of ways, including analog circuitry, digital circuits, hardware, software, firmware, and combinations thereof. For example, a microcontroller, a microprocessor, a CPU, a general-purpose digital signal processor, dedicated hardware, and the like can be used.

To measure the centroids of multiple spots, a number of conditions are preferable. First, the sensor preferably does not become saturated with light, ambient or otherwise. In one embodiment, this is accomplished by using optical filters to reduce or minimize unwanted light sources that project onto the active area of the PSD sensor and by biasing the PSD to increase the light level at which it becomes saturated. Second, to measure the position of a particular light source reliably, it is preferable to isolate the light source from other light sources by reducing or eliminating the effect of other light sources, which can include ambient light and light generated by other spots. One approach is to isolate one light source is to modulate the light source with a unique pattern such that it is distinguished from other light sources. If the i-th emitter on-off modulates the projected light with a frequency $f_i$, the PSD sensor can extract the signal generated by filtering a signal using a band-pass filter with lower and upper frequencies of $f_i-w$ and $f_i+w$, respectively, where 2w corresponds to the width of the corresponding band-pass filter. The signal processing unit of the PSD can use the filter to suppress signals with frequencies outside the frequency range defined by the band-pass filter. The filtering of the PSD signal can occur either before or after the PSD currents are converted into associated centroid positions. In one embodiment, where the first emitter is modulated at a frequency $f_1$ and the second emitter is modulated at a frequency $f_2$, and wherein $f_1 \neq f_2$, the signal processing unit filters the signal specified by $f_1$ to measure $c_1$, the centroid of the first spot, and filters the signal specified by $f_2$ to measure $c_2$, the centroid of the second spot.

Exemplary Method for Pose Estimation

In one embodiment, the apparatus includes N emitters, which project N light spots, and M cameras. The position of the i-th camera in the global reference frame is denoted herein by $S_i=(x_i, y_i, z_i)$, and the rotational orientation of the i-th camera in the global reference frame is denoted herein by $R_i=(\alpha_i, \beta_i, \theta_i)$. The position of the j-th light spot is denoted herein by $w_j$, and the position of the projection of the j-th spot onto the i-th camera is denoted herein by $c_{i,j}$. Then, the following relationship relates $S_i$, $w_j$, and $c_{i,j}$.

$$c_{i,j}=P_i R_i(w_j-S_i) \qquad \text{Equation 1}$$

In Equation 1, $R_i$ represents the three-degree-of-freedom rotation transformation, which, in one embodiment, results from the composition of three mutually orthogonal one-degree-of-freedom rotation transformations, such as $R_i=R_\alpha R_\beta R_\theta$. Also in Equation 1, $P_i$ represents the perspective transformation associated with the i-th camera. Thus, Equation 1 defines three equations for six unknowns, in which the unknowns are $x_i, y_i, z_i, \alpha_i, \beta_i,$ and $\theta_i$. In a system with N spots and M cameras, N×M such matrix equations can be formulated, but not all such equations are necessarily unique, independent, and non-degenerate. Thus, with two spots and one camera, values for x, y, and θ can be determined. To determine all six degrees of freedom, it is preferable to have a configuration of spots and cameras that generates at least six independent, non-degenerate equations analogous to Equation 1.

Exemplary System with Two Emitters and One Camera

In one embodiment, the system includes two spots projected onto the ceiling and one optical position sensor with one PSD camera. The relationship between a spot $w_i$ and its projection $c_j$ in the PSD camera reference frame is given by the following equation.

$$c_j=PR_\theta(w_i-S) \qquad \text{Equation 2}$$

In Equation 2, S represents the position of the PSD camera in the global reference frame, and P represents the transformation from a point (X,Y,Z) in the global coordinate system to a point (u,v,z) in the PSD camera reference frame. Also, for the purposes of this example, the z axis of the camera coordinate system is aligned with the Z axis of the global coordinate system in the vertical direction. This implies that $R_\alpha$ and $R_\beta$ correspond to identity matrices; accordingly, $R_\alpha$ and $R_\beta$ have been omitted from Equation 2. In the case of a pinhole camera model, P corresponds to the scalar value $\lambda/(\lambda-Z)$, where λ represents the focal length of the camera. It will be understood that multiplication by a scalar value can also be achieved by multiplication by the corresponding multiple of the appropriately-dimensioned identity matrix. Also in Equation 2, $R_\theta$ can be represented by the following unitary matrix.

$$R_\theta = \begin{pmatrix} \cos\theta & \sin\theta & 0 \\ -\sin\theta & \cos\theta & 0 \\ 0 & 0 & 1 \end{pmatrix} \qquad \text{Equation 3}$$

Equation 2 can be re-written as follows.

$$w_j-S=R_\theta^{-1}P^{-1}c_j \qquad \text{Equation 4}$$

In Equation 4, $P^{-1}$ represents the inverse perspective transformation, and $R_\theta^{-1}$ represents the inverse rotation transformation. When the position of the i-th spot is associated with appropriate camera parameters, such as the camera focal length in a pinhole camera model, then Equation 4 defines two non-degenerate equations in three unknowns x, y, and θ for each measurement $c_j$. Thus, the three variables, x, y, and θ, together determine the pose of the PSD camera.

Because two equations in three unknowns do not define a unique solution for the pose of the PSD camera, it is preferable to use more independent equations than unknowns. With two spots and one PSD camera, it is possible to generate four equations in three unknowns as follows.

$$w_1-S=R_\theta^{-1}P^{-1}c_1 \qquad \text{Equation 5}$$

$$w_2-S=R_\theta^{-1}P^{-1}c_2 \qquad \text{Equation 6}$$

Equation 5 relates the spot $w_1$ with its associated PSD camera position $c_1$, and Equation 6 relates the spot $w_2$ with its associated PSD camera position $c_2$. Subtracting Equation 5 from Equation 6 generates the following matrix equation expressed in Equation 7.

$$w_2-w_1=R_\theta^{-1}P^{-1}(c_2-c_1) \qquad \text{Equation 7}$$

Equation 7 can be expanded as follows.

$$\begin{pmatrix} 0 \\ \Delta y \\ 0 \end{pmatrix} = R_\theta^{-1} P^{-1} \begin{pmatrix} \Delta u \\ \Delta v \\ 0 \end{pmatrix} \quad \text{Equation 8}$$

The matrix equation given in Equation 8 expresses two non-degenerate linear equations. In Equation 8, $\Delta y = d = y_2 - y_1$, $\Delta u = u_2 - u_1$, and $\Delta v = v_2 - v_1$. As discussed earlier in connection with FIG. 3, d represents the distance that separates the two spots. Accordingly, the first of the two non-degenerate linear equation defined by Equation 8 is given by the following.

$$0 = P^{-1}(\Delta u \cos\theta - \Delta v \sin\theta) \quad \text{Equation 9}$$

Solving for $\theta$ in Equation 9 gives $\theta = \tan^{-1}(\Delta u/\Delta v)$, and substituting this result into Equation 5 provides the following solution for S, the position of the PSD camera in the global reference frame.

$$S = w_1 - R_\theta^{-1} P^{-1} c_1 |_{\theta = \tan^{-1}(\Delta u/\Delta v)} \quad \text{Equation 10}$$

Accordingly, the pose (x, y, $\theta$) of the PSD camera as a function of the measurements $c_1$ and $c_2$ can be determined using Equation 9 and Equation 10.

An Example of Using One Emitter and One Camera

In one embodiment, the system includes one spot projected onto the ceiling and one optical position sensor with one PSD camera. Similar to the relationship discussed earlier in connection with Equation 2, the relationship between the spot w and its projection c in the PSD camera reference frame is given by the following equation.

$$c = PR_\theta(w - S) \quad \text{Equation 11}$$

Because the origin of the global coordinate system can be chosen, without loss of generality, such that the spot w is located directly above the origin, rearranging Equation 11 provides the following solution for S.

$$w - S = R_\theta^{-1} P^{-1} c \quad \text{Equation 12}$$

Equation 12 can be rewritten in coordinate notation to give the following relationship.

$$\begin{pmatrix} -x \\ -y \\ z \end{pmatrix} = \begin{pmatrix} \cos\theta & -\sin\theta & 0 \\ \sin\theta & \cos\theta & 0 \\ 0 & 0 & 1 \end{pmatrix} P^{-1} \begin{pmatrix} u \\ v \\ 0 \end{pmatrix} \quad \text{Equation 13}$$

Thus, Equation 13 specifies two non-degenerate linear equations. In the case that $P^{-1}$ corresponds to a scalar or to a scalar multiple of an identity matrix, squaring and summing the two non-degenerate linear equations and simplifying the result yields the following.

$$x^2 + y^2 = (P^{-1})^2[(u\cos\theta - v\sin\theta)^2 + (u\sin\theta + v\cos\theta)^2] = (P^{-1})^2(u^2 + v^2) \quad \text{Equation 14}$$

Because $x^2 + y^2$ is equal to $\|S\|^2$ and $u^2 + v^2$ is equal $\|c\|^2$, Equation 14 can be simplified to $\|S\|^2 = (P^{-1})^2 \|c\|^2$, or $\|S\| = P^{-1} \|c\|$.

Thus, the distance measurement $\|c\|$, and the corresponding distance measurement $\|S\|$, can define a circle in an x-y plane centered at the origin (0, 0) with radius $\|S\|$. A tangent to the circle at the position of the sensor at the position of the sensor (that is, at S), is orthogonal to the vector $s = (x\ y)^T$, where the superscripted "T" denotes the vector or matrix transposition operation. The tangent $\hat{s}$ can therefore be expressed as $\hat{s} = (y - x)^T$. The rotational orientation, $\phi$, of the robot of the robot with respect to $\hat{s}$ can then be estimated using a measurement of c as given in the following relationship.

$$\phi = \tan^{-1}(u/v) \quad \text{Equation 15}$$

Thus, in this embodiment, $\|S\|$ and $\phi$ can be determined, which can advantageously support applications for robotics, person tracking, object tracking, and the like. In one example, the spot is projected onto the ceiling directly above a docking station, and the optical position sensor with one PSD camera is attached to a robot. Using the estimation of $\|S\|$ and $\phi$, the robot can guide itself to turn toward the spot and approach the spot. In this manner, the robot can approach the docking station and recharge itself. In an alternative example, the projector can correspond to a handheld projector and can be used to point above a user-selected object or location of interest to guide to the robot to the object or location. This alternative example provides a powerful interface for robot interaction.

EXAMPLES OF OTHER EMBODIMENTS OF THE INVENTION

One embodiment of the method and apparatus includes a camera, such as a CCD camera, a CMOS camera, and the like, and a projector that generates a pattern on a projection surface, such as a ceiling. It will be understood that this embodiment can include multiple cameras and/or multiple projectors. By way of example, the projector can correspond to a slide projector, and the pattern can be encoded in a slide. In one embodiment, at least one pattern has the shape of a circle, and in another embodiment, at least one pattern has the shape of a square. Each camera generates grayscale or color images. A signal processing unit processes the camera images, extracts the unique patterns, and estimates a position of the pattern in camera sensor coordinates. The position of the pattern can be defined as the centroid of the pattern. The position of the j-th pattern in the global reference frame can be denoted herein by and the position of the j-th pattern in the reference frame of the i-th camera can be denoted herein by $c_{i,j}$. Then, the relationship between the j-th pattern and its projection onto the i-th camera is defined by Equation 1. The signal processing unit captures the camera images and processes the images using one or more image analysis techniques to detect and extract the position of known patterns. The image analysis techniques can include, by way of example, line and corner detection (to detect a square pattern, for example), Hough transform (to detect a circle, for example), and the like. After the positions of the patterns in the camera reference frames are determined, the signal processing unit can estimate the positions of the cameras with respect to the global reference frame using the methods described previously. Optionally, one or more of the projectors can modulate on-off to reduce the effects of ambient light. The modulation frequencies can advantageously be used to associate a unique identifier with each pattern. In one embodiment, the identifier of a pattern is advantageously encoded within the pattern itself. As an example, the shape of the pattern can define a unique identifier, if distinct shapes are used for each pattern. For example, the system can distinguish between a square pattern and a circular pattern and associate different identifiers with each pattern.

In one embodiment, the modulation frequency of the projector can encode information, such as bit patterns to transmit a message that can be detected and extracted by the camera and the signal processing unit. The bit patterns can be modulated in the signal using any of a variety of common modulation techniques, such as pulse width modulation, space width modulation, and phase modulation.

In another embodiment, the bit patterns are modulated on top of the original "carrier" frequency of the spot. The projectors and optical position sensors can advantageously be used for optical wireless communication. In this embodiment, the projector projects the light pattern on a reflecting surface, and the optical sensor detects the signal by viewing the reflecting surface, which eliminates the need for line-of-sight between the emitter and the sensor. The signal modulated in the projected light can carry commands, such as commands for a robot, similar to the way in which light modulated by a remote control unit can carry commands to an appliance. In one example, the projection of the spot on the ceiling directly above a docking station enables the robot to find the docking station and perform self-charging. In addition, an interface with the docking station, such as a button on the docking station, can generate a command to the robot to return to the charging station.

Yet another embodiment of the method and apparatus includes a projector for one or more distinct regions of an environment, such as a projector for each distinct region. Advantageously, this embodiment expands the coverage of localization throughout relatively large areas or throughout multiple relatively confined areas, such as multiple rooms. The covered area associated with one projector can be constrained by the field of view of the camera, the distance from the projector to the reflection surface, and the presence of objects and walls that obstruct the camera's view of the spot. Increasing the number of light patterns can increase the coverage area. In one embodiment, for coverage across multiple rooms, one or more projectors are provided for each room in which coverage is desired, so that, for example, each room can have a dedicated projector. For example, each projector can project one or more spots that have an identifier that is unique within the room. It will be understood that the identifier associated with a spot can be based on the spot's modulation frequency, the spot's shape, the spot's color, or another appropriate characteristic that can be detected by the camera sensor.

In one implementation, the combination of the individual spot identifiers with a room can define a unique identifier for the room. By way of example, a first room can have two spots having associated unique identifiers "A" and "B," and a second room can have two spots having associated unique identifiers "A" and "C." The unique identifiers for each room can advantageously be used by a system, such as by a robot, to build a topological map of the rooms and the connectivity of the rooms. Without a unique identifier for each room or region, the system can disadvantageously generate ambiguous position information. As an illustration, without a unique identifier for each room, the position associated with an (x,y) coordinate of a first room can generally not be distinguished from the position associated with the (x,y) coordinate of a second room.

Although this invention has been described with reference to these specific embodiments, the descriptions are intended to be illustrative of the invention and are not intended to be limiting. Various modifications and applications may occur to those skilled in the art without departing from the true spirit and scope of the invention.

What is claimed is:

1. A robot comprising:
   a drive system comprising a plurality of wheels;
   an optical position sensor; and
   a control system configured to perform operations comprising:
   estimating a position of the robot using the optical position sensor and wheel odometry data for the plurality of wheels;
   tracking a history of a plurality of paths taken by the robot using a plurality of estimated positions; and
   detecting a light projected by a handheld device and guiding the robot to a location based on the light projected by the handheld device.

2. The robot of claim 1, wherein the control system is configured to detect the projected light with the optical position sensor.

3. The robot of claim 1, wherein the optical position sensor comprises a camera, and the robot further comprises a signal processing unit coupled to the camera.

4. The robot of claim 3, wherein the optical position sensor is configured to measure the intensity of light incident on the camera and, using the signal processing unit, generate one or more signals to estimate the position of the optical position sensor relative to a projected light pattern.

5. The robot of claim 3, wherein the optical position sensor is configured to measure a centroid of the light projected by the handheld device.

6. The robot of claim 5, wherein the optical position sensor is configured to measure the centroid by generating electrical current proportional to the position and intensity of the light centroid.

7. The robot of claim 1, wherein the optical position sensor comprises a camera having a field of view configured to extend upward so as to intersect at least a portion of a ceiling.

8. The robot of claim 1, wherein the robot comprises a bottom side and a top side and the optical position sensor faces upward and away from the top side of the robot.

9. The robot of claim 1, wherein the operations comprise navigating along a planned, traversable path to a specified location using the plurality of estimated positions.

10. The robot of claim 1, wherein the operations comprise estimating a height of a ceiling using the optical position sensor and a plurality of wheel odometry data points for the plurality of wheels.

11. The robot of claim 1, comprising a plurality of wheel encoders, one for each of the plurality of wheels.

12. The robot of claim 1, wherein the robot is an autonomous robotic vacuum cleaner.

13. A method performed by a control system of a robot, the method comprising:
   estimating a position of the robot using an optical position sensor and wheel odometry data for a plurality of wheels of a drive system for the robot;
   tracking a history of a plurality of paths taken by the robot using a plurality of estimated positions; and
   detecting a light projected by a handheld device and guiding the robot to a location based on the light projected by the handheld device.

14. The method of claim 13, comprising navigating the robot along a planned, traversable path to a specified location using the plurality of estimated positions.

15. The method of claim 13, wherein the projected light is detected with the optical position sensor.

16. The method of claim 13, wherein the optical position sensor comprises a camera.

17. The method of claim 16, comprising measuring, using the optical position sensor, the intensity of light incident on the camera and, using a signal processing unit, generating one or more signals to estimate the position of the optical position sensor relative to a projected light pattern.

18. The method of claim 16, measuring, using the optical position sensor, a centroid of the light projected by the handheld device.

19. The method of claim 18, wherein measuring the centroid comprises generating electrical current proportional to the position and intensity of the light centroid.

20. The method of claim 13, wherein the robot comprises a bottom side and a top side and the optical position sensor faces upward and away from the top side of the robot.

21. The method of claim 13, comprising estimating a height of a ceiling using the optical position sensor and a plurality of wheel odometry data points for the plurality of wheels.

22. The method of claim 13, comprising obtaining the wheel odometry data using a plurality of wheel encoders, one for each of the plurality of wheels.

23. The method of claim 13, wherein the robot is an autonomous robotic vacuum cleaner.

* * * * *